United States Patent
Hanington

(10) Patent No.: US 7,482,524 B1
(45) Date of Patent: Jan. 27, 2009

(54) SYSTEM AND METHOD FOR TEACHING MUSIC

(76) Inventor: Darlene Hanington, 706 Barton Ave., Glenn Heights, TX (US) 75154

( * ) Notice: Subject to any disclaimer, the term of this patent is extended or adjusted under 35 U.S.C. 154(b) by 0 days.

(21) Appl. No.: 11/284,784

(22) Filed: Nov. 21, 2005

Related U.S. Application Data

(63) Continuation of application No. 10/630,370, filed on Jul. 29, 2003, now Pat. No. 6,967,274.

(51) Int. Cl.
*G09B 15/00* (2006.01)
(52) U.S. Cl. .................................................. 84/470 R
(58) Field of Classification Search ............... 84/470 R, 84/476, 484
See application file for complete search history.

(56) References Cited

U.S. PATENT DOCUMENTS

| | | | |
|---|---|---|---|
| 1,319,919 A | 10/1919 | Barker | |
| 3,817,145 A | 6/1974 | Cohen | |
| 3,955,466 A | 5/1976 | Goldmark | |
| 4,012,979 A | 3/1977 | Wemekamp | |
| 4,295,408 A | 10/1981 | Pasker | |
| 4,321,853 A | 3/1982 | Tumblin | |
| 4,351,215 A | 9/1982 | van der Bruggen | |
| 4,924,743 A * | 5/1990 | Tsai | 84/476 |
| 5,597,968 A | 1/1997 | Okamoto | |
| 5,949,010 A | 9/1999 | Hacker | |
| 6,015,947 A | 1/2000 | Moberg | |
| 6,031,172 A | 2/2000 | Papadopoulos | |
| 6,211,451 B1 | 4/2001 | Tohgi et al. | |
| 6,215,057 B1 | 4/2001 | Oren-Chazon | |
| 6,271,453 B1 | 8/2001 | Hacker | |
| 6,337,434 B2 | 1/2002 | Oren-Chazon | |
| 6,388,182 B1 | 5/2002 | Bermudez | |
| 6,452,081 B1 | 9/2002 | Ravagni et al. | |
| 6,506,969 B1 | 1/2003 | Baron | |
| 6,967,274 B2 * | 11/2005 | Hanington | 84/476 |

OTHER PUBLICATIONS

Roe, "Note Values Music Blocks," The Artist Magazine, Nov. 1985.

* cited by examiner

*Primary Examiner*—Kimberly R Lockett
(74) *Attorney, Agent, or Firm*—Clayton, Howarth & Cannon, P.C.

(57) ABSTRACT

A system and method for teaching music both visually and tactilely. In one embodiment, the invention comprises blocks shaped to resemble musical symbols used to compose music, including time signatures, notes, rests, and dots. Each of the blocks are relative in thickness such that for a given time signature, the correct rhythm for a given measure can be determined by laying one or more of the notes, rests and dots one over the other to see if their combined thickness is equal to that of a preselected time signature. The thickness of the block shaped to resemble the time signature is such that it only allows the correct number of blocks shaped as notes, rests or dots to be of equal thickness to thereby determine the correct rhythm. In addition, the correct rhythm can be determined by simply reading the shaped blocks as one would read music. The use of the shaped blocks having relative thicknesses allows a student to learn rhythm by trial and error and does not necessarily require that the student understand complex music theory. In addition, the blocks can be used by the student when clapping the correct rhythms. Other musical notation can be represented by blocks as well such as bar lines and slurs.

75 Claims, 12 Drawing Sheets

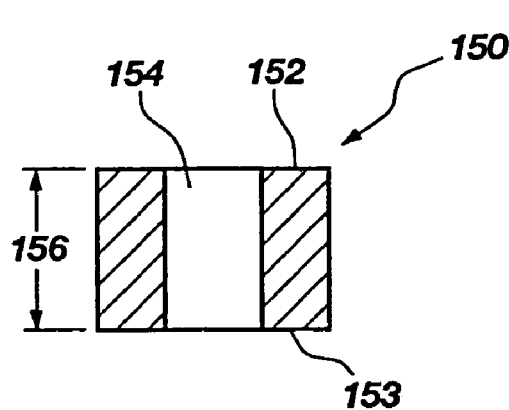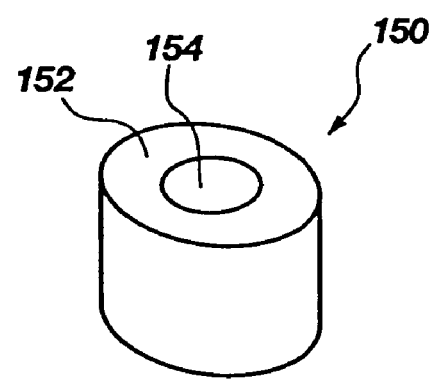
FIG. 5B  FIG. 5A
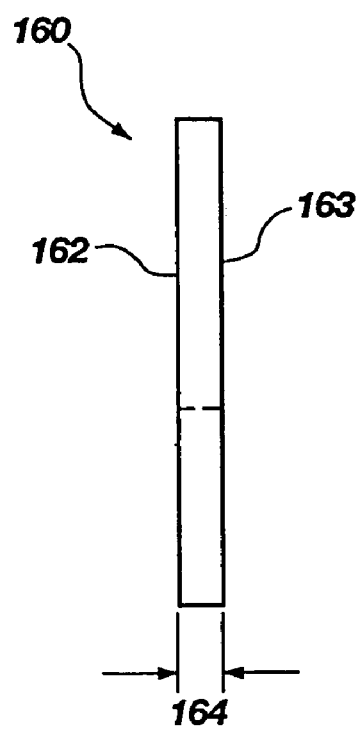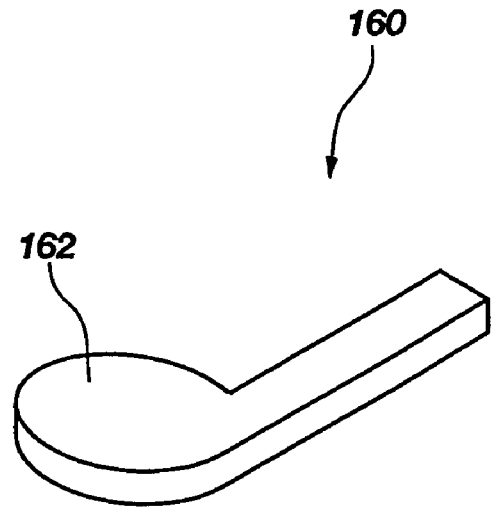
FIG. 6B  FIG. 6A

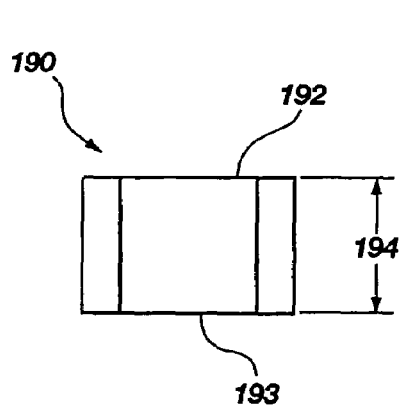
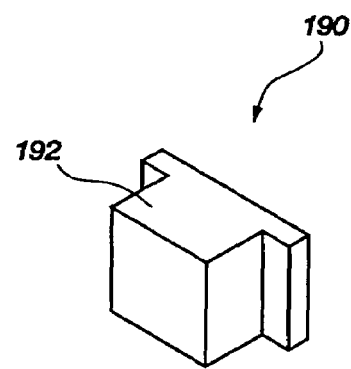
FIG. 9B     FIG. 9A
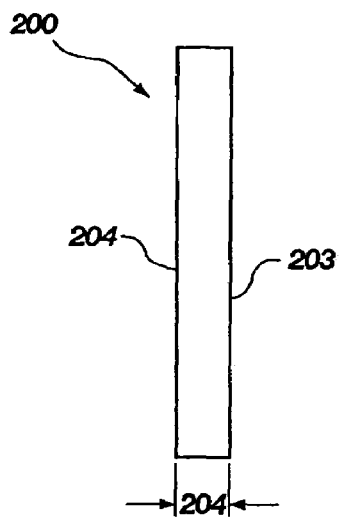
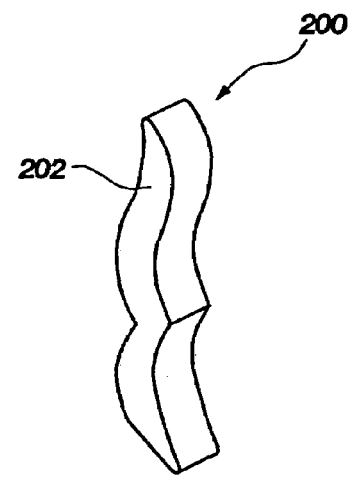
FIG. 10B     FIG. 10A
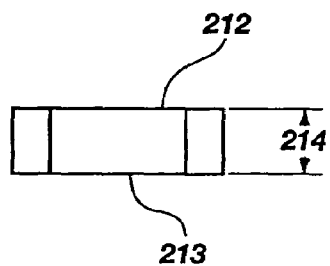
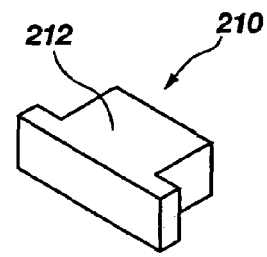
FIG. 11B     FIG. 11A

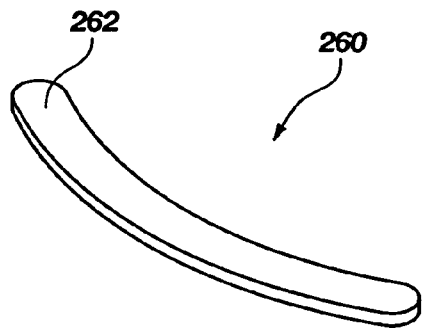
FIG. 16A
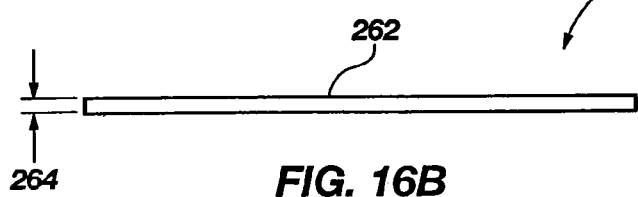
FIG. 16B
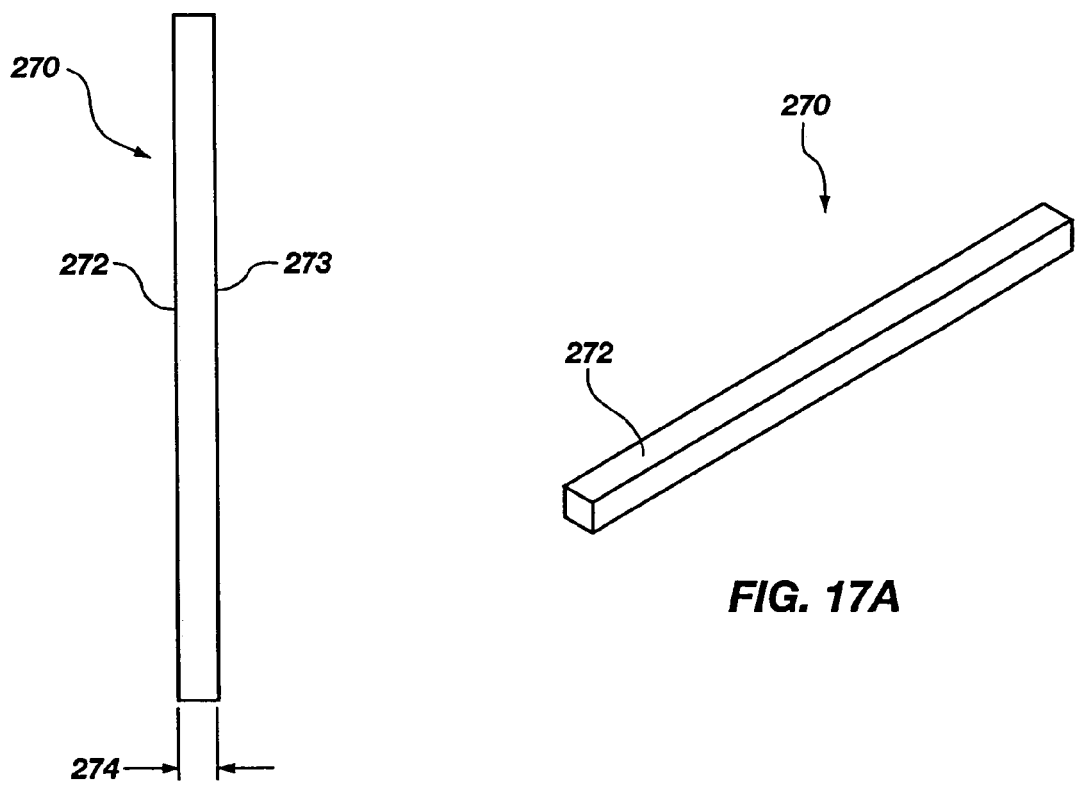
FIG. 17A
FIG. 17B

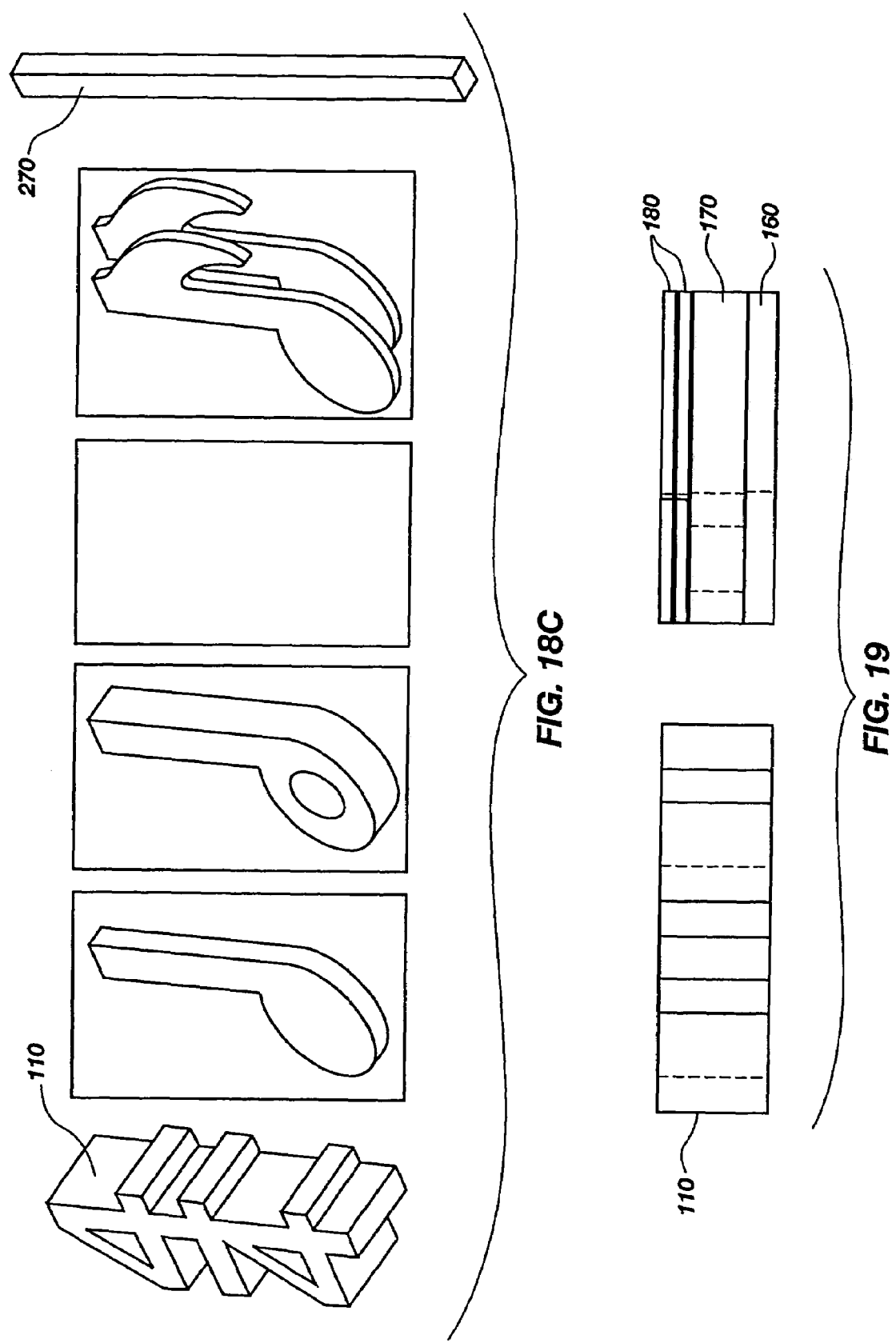

SYSTEM AND METHOD FOR TEACHING MUSIC

CROSS-REFERENCE TO RELATED APPLICATIONS

This application is a continuation of U.S. patent application Ser. No. 10/630,370, filed Jul. 29, 2003 now U.S. Pat. No. 6,967,274, entitled "System and Method for Teaching Music," which is hereby incorporated by reference herein in its entirety, including but not limited to those portions that specifically appear hereinafter, the incorporation by reference being made with the following exception: In the event that any portion of the above-referenced application is inconsistent with this application, this application supercedes said above-referenced application.

STATEMENT REGARDING FEDERALLY SPONSORED RESEARCH OR DEVELOPMENT

Not Applicable.

BACKGROUND OF THE INVENTION

1. The Field of the Invention

The present invention relates generally to systems and methods for teaching music, and more particularly, but not necessarily entirely, to a structure utilized to readily teach a student the correct rhythm for a measure in a given time signature.

2. Description of Related Art

One of the most difficult concepts to master when learning to read and play music is that of rhythm. Rhythm is generally referred to as the pattern of musical movement through time. This concept is especially difficult for children, who may have difficulty understanding the abstract concepts of music theory which encompass note reading and even mathematics to some degree. In a musical piece, the rhythm is principally determined by the time signature and note values selected by the composer at the time the piece was created. The time signature is typically located in the first measure of a musical piece. The time signature comprises two separate values, often indicated as one number placed over another number. In simple time, the top number indicates the number of beats per measure while the bottom number indicates the note value that will receives one beat. Note values typically comprise whole notes, half notes, quarter notes, sixteenth notes, etc. Therefore the time signature three-four time indicates that each measure has three beats and that each beat is occupied by a quarter note. Notice that the four symbolizes the quarter note because it is ¼ of the whole note.

Traditionally, rhythm has been taught to children in various methods. The most common method is by having an instructor clap a rhythm and having the students repeat the rhythm while clapping. This can be done while listening to a musical piece or reading the music from a sheet. In addition, the explanation of rhythm from the pie chart has also been used. In this method, a whole pie is drawn and shown to the students as representing a whole note. It is then explained that cut in half, the pieces represent two half notes. This demonstration can continue to explain quarter notes and so on. Another teaching method for rhythm employs paper and pencil. This includes having the students fill in blank musical measures with the appropriate note values such that the correct rhythm is ascertained.

The prior art is thus characterized by several disadvantages that are addressed by the present invention. The present invention minimizes, and in some aspects eliminates, the above-mentioned failures, and other problems, by utilizing the methods and structural features described herein.

The features and advantages of the invention will be set forth in the description which follows, and in part will be apparent from the description, or may be learned by the practice of the invention without undue experimentation. The features and advantages of the invention may be realized and obtained by means of the instruments and combinations particularly pointed out in the appended claims.

BRIEF DESCRIPTION OF THE DRAWINGS

The features and advantages of the invention will become apparent from a consideration of the subsequent detailed description presented in connection with the accompanying drawings in which:

FIGS. 5A and 5B are schematic views of a whole note block;

FIGS. 6A and 6B are schematic views of a quarter note block;

FIGS. 9A and 9B are schematic views of a whole note rest block.

FIGS. 10A and 10B are schematic views of quarter note rest block;

FIGS. 11A and 11B are schematic views of a half note rest block;

FIGS. 16A and 16B is a schematic view of a slur line block;

FIGS. 17A and 17B is a schematic view of a bar line block;

FIGS. 18A, 18B, and 18C illustrate examples of how the present invention visually and tactilely teach the correct rhythm for a given time signature;

FIG. 19 is a side view of various blocks showing the relationship between various blocks including master and cadence blocks;

DETAILED DESCRIPTION OF THE EMBODIMENTS

Figure 1B:
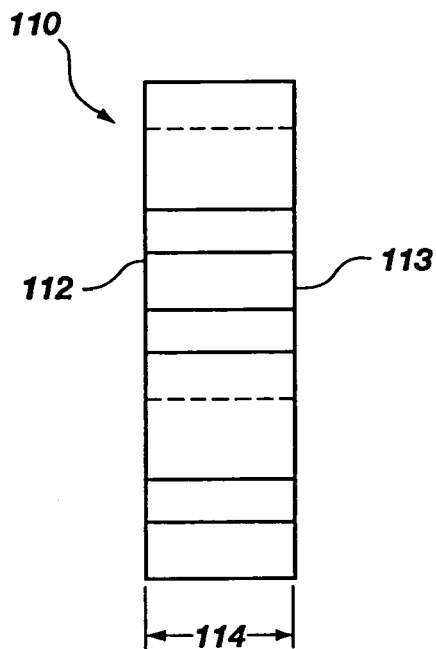
FIGS. 1A and 1B are schematic views of a four-four time signature block.

For the purposes of promoting an understanding of the principles in accordance with the invention, reference will now be made to the embodiments illustrated in the drawings and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would normally occur to one skilled in the relevant art and having possession of this disclosure, are to be considered within the scope of the invention claimed.

It must be noted that, as used in this specification and the appended claims, the singular forms "a," "an," and "the" include plural referents unless the context clearly dictates otherwise. Thus, for example, reference to a note may include one or more notes. In describing and claiming the present invention, the following terminology will be used in accordance with the definitions set out below.

As used herein, the terms "comprising," "including," "containing," "characterized by," and grammatical equivalents thereof are inclusive or open-ended terms that do not exclude additional, unrecited elements or method steps.

By way of overview and understanding of the general concepts of the present invention and in no way limiting, the present invention comprises a system and method for helping music students, especially children, to understand rhythm through tactile and visual representation. In one embodiment of the present invention, the system comprises a plurality of blocks shaped like musical notation that might be found in sheet music, including time signatures, notes, rests and other music symbols. The blocks representing time signatures, notes and rests are proportional in thickness to each other such that a student can easily determine the correct rhythm for a measure of music with a given time signature by either reading the music blocks in the traditional manner or by comparison of the thicknesses of the note and rest blocks to the thickness of the selected time signature. When a combination of note blocks and rest blocks laid on top of each other equal the height of a preselected time signature block, then the student knows that the correct rhythm has been found. The student quickly learns that different combinations of notes and rests can be used in a measure while maintaining the correct rhythm. Further, because the notes are like a puzzle, the student can rearrange the blocks until the correct rhythm is obtained by trial and error.

In addition, because the blocks are shaped to resemble actual musical notation, i.e. time signatures, notes and rests, the correct rhythm can also be determined by "reading" the notes as would be done with sheet music. The student can also learn by clapping the rhythm created with the blocks with or without the help of an instructor. Thus, it will be appreciated that the present invention is advantageous over the previously available systems and methods by allowing a music student to learn by, among other things, touching, seeing and hearing.

Different embodiments of the invention will now be described with the aid of the accompanying drawings.

In one embodiment of the invention, a system for teaching rhythm comprises a plurality of blocks shaped as varying types of musical notation. The blocks are preferably comprised of thermoplastic which can be created by an injection molding process. It will be appreciated that blocks comprised of thermoplastic are significantly superior to the wood blocks as previously disclosed in the art. Thermoplastic blocks ensures that the proper block thickness is obtained, unlike wood blocks, which varied from block to block due to the sanding process. Further, blocks comprised of thermoplastic also have the advantage that they do not need to be painted as do wood blocks. Also, blocks comprised of thermoplastic are less likely to be damaged or broken during use.

In general, the blocks of the system may be divided into three different types, master blocks, cadence blocks, and notation blocks. Each of these will be described in detail below.

Master Blocks

The term "master block" as used herein refers to blocks that indicate both visually and tactilely a time signature. A time signature typically comprises an upper value and a lower value when printed on a music sheet. The time signature appears as a fraction in some cases. In simple time, the upper value indicates the number of beats per measure. The lower value indicates the note receiving one beat. For example, in 4/4 time, which is also commonly written as "four-four time," each measure receives four beats and the quarter note is allocated one beat.

As mentioned above, a master block may indicate a time signature in two ways, visually and tactilely. Visual indication encompasses the reading of the time signature from a symbol or text conveyed by the master block. In one embodiment, the master block is shaped to resemble a time signature which can be easily read. Alternatively, a master block may have the time signature printed, etched or printed as text on the block which can also be read.

Tactile indication of the time signature involves a control reference feature. The control reference feature is a physical characteristic of a master block having a dimension that is used to represent the time signature visually indicated by the block. The control reference feature may be the thickness, length, height, width of any side of the master block.

It is important to note that the dimension of the control reference feature may be arbitrarily chosen if the dimension of the control reference features of any other master blocks has not been established. It is typical to establish the dimension of the control reference feature of one of the master blocks. This dimension can be referred to as the benchmark dimension. Once established, the benchmark dimension can be used as a benchmark by which the dimensions of the control reference features of the other master blocks are determined. Further, as will be described below, the dimensions of the cadence blocks also depend on the benchmark dimension.

Again, once the benchmark dimension has been established for a control reference feature in any master block, the dimensions of the control reference features of the other master blocks follow automatically. For example, if the control reference feature dimension for a master block representing a four-four time signature is set, it follows that the dimension of the control reference feature of a master block representing a three-four time signature is three-quarters that of the four-four time block. This also holds true for two-four time block, whose control reference feature dimension feature would be one-half that of that of a four-four time block.

In general, the most popular time signatures include four-four time, three-four time, two-four time, and six-eight time. The preceding list is not meant to be comprehensive but is presented for illustrative purposes only. Other time signatures as known to those skilled in the art that are not mentioned are also within the scope of the present invention.

Figure 1A:
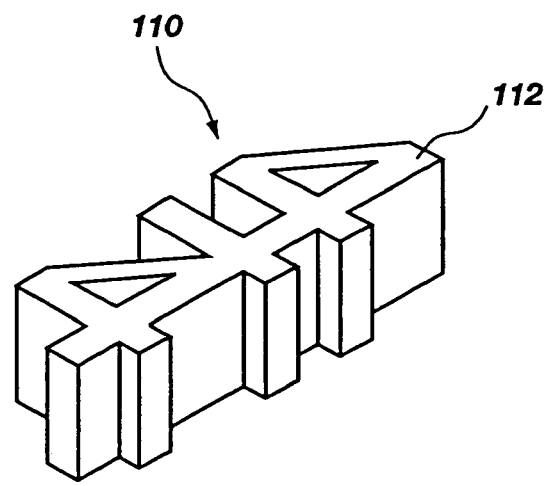

An illustrative four-four time signature block 110 is shown in FIG. 1A. The four-four time signature block 110 is configured in shape to resemble the appearance of a four-four time signature as would be observed on a sheet of music. In particular, the top surface 112 and bottom surface 113 (shown in FIG. 1B) has an upper "4" over a lower "4" which are separated by a line.

As can be seen in FIG. 1B, the thickness of the block between the top surface 112 and the bottom surface 133 is shown generally by the double ended arrow marked by the reference numeral 114. The thickness of the four-four time signature block 110 is the control reference feature. In one embodiment, the thickness of the block is about 1.25 inches.

Figure 2B:
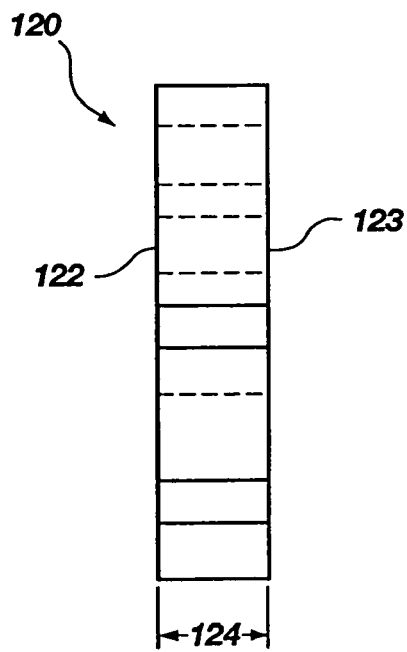
FIGS. 2A and 2B are schematic views of a three-four time signature block.
Figure 2A:
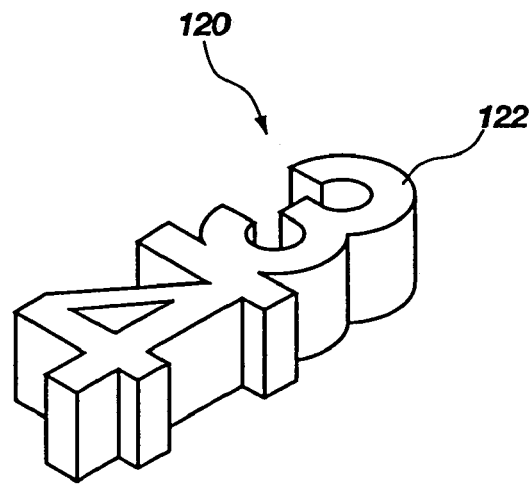

An illustrative three-four time signature block 120 is generally shown in FIG. 2A. The three-four time signature block 120 is configured in shape to resemble the appearance of a three-four time signature as would be observed on a sheet of music. In particular, the top surface 122 and bottom surface 123 (shown in FIG. 2B) have an upper numeral "3" over a lower numeral "4" which are separated by a line.

The thickness of the three-four time signature block 120 between the top surface 122 and the bottom surface 123, is generally shown by the double arrow represented by the reference numeral 124, is determined in proportion to the thickness of the four-four time signature block 110, assuming that the control reference feature of the four-four time signature block is the benchmark. Since a three-four time signature block 120 indicates three beats per measure, its thickness should be three-quarters of the thickness of the four-four time signature. In the case of the embodiment wherein the four-four time signature block 110 has a thickness of about 1.25 inches, the three-four time signature block 120 would have a thickness of about 0.94 inches.

Figure 3B:
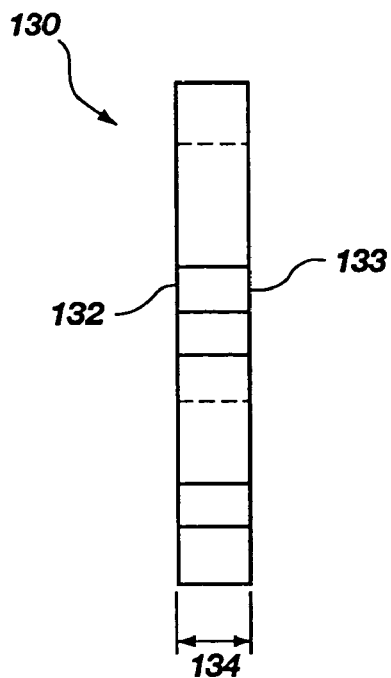
FIGS. 3A and 3B are schematic views of a two-four time signature block.
Figure 3A:
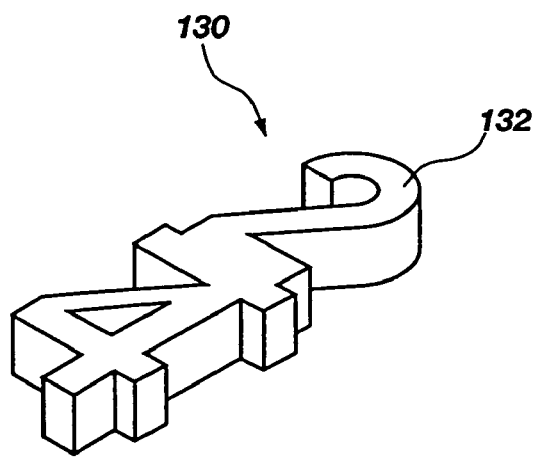

An illustrative two-four time signature block 130 is generally shown in FIG. 3A. The two-four time signature block 130 is configured in shape to resemble the appearance of a two-four time signature as would be observed on a sheet of music. In particular, the top surface 132 and the bottom surface 133 (shown in FIG. 3B) has an upper numeral "2" over a lower numeral "4" which are separated by a line.

The thickness of the two-four time signature block 130 between the top surface 132 and the bottom surface 133, is generally represented by the double arrow marked as reference numeral 134 in FIG. 3B, can be determined in proportion to the thickness of the four-four time signature block 110. Since a two-four time signature block 130 indicates two beats per measure, its thickness should be two-fourths or one-half of the thickness of the four-four time signature. In the case of the embodiment wherein the four-four time signature block 110 has a thickness of about 1.25 inches, the two-four time signature block 130 would have a thickness of about 0.625 inches.

Figure 4B:
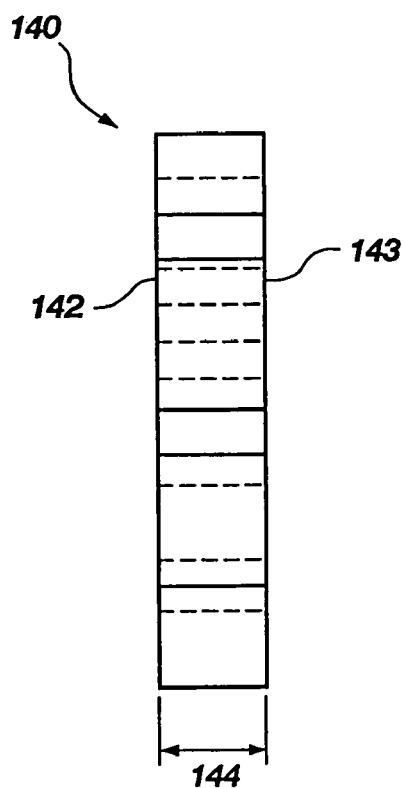
FIGS. 4A and 4B are schematic views six-eight time signature block.
Figure 4A:
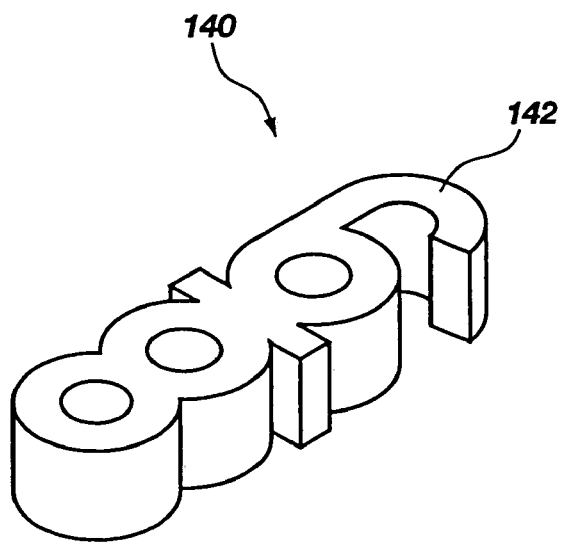

An illustrative six-eight time signature block 140 is generally shown in FIG. 4A. Six-eight time signature is known as a compound signature. The six-eight time signature block 140 is configured in shape to resemble the appearance of a six-eight time signature as would be observed on a sheet of music. In particular, the top surface 142 and the bottom surface 143 (shown in FIG. 4B) has an upper numeral "6" over a lower numeral "8" which are separated by a line.

The thickness of the six-eight time signature block 140 between the top surface 142 and the bottom surface 143, generally represented by the double arrow marked with the reference numeral 144 in FIG. 4B, is determined in proportion to the thickness of the four-four time signature block 110. Since a six-eight time signature block 140 indicates six beats per measure with an eighth note receiving one beat, its thickness should be 6/8 or 3/4 of the thickness of the four-four time signature. In the case of the embodiment wherein the four-four time signature block 110 has a thickness of about 1.25 inches, the six-eight time signature block 140 would have a thickness of about 0.94 inches.

It should be noted other time signatures as commonly known in the art are possible as well. It is within the scope of this invention that these other time signatures be formed as blocks. Further, it is not necessary that the time signatures be of a particular style, and in fact it is within the scope of this invention that the numbers can be of varying styles.

Cadence Blocks

As the term is used herein, "cadence blocks" refers to blocks that indicate a relative duration value for a note or a rest both visually and tactilely for a given time signature. Further, cadence blocks includes blocks that indicate a change in the duration value of a note, such as a dot. Visual indication of the duration value encompasses the reading of the duration value as would be done on a sheet of music. This is accomplished by a note or rest value represented in or on the cadence block. Symbols for note and rest values are well known in the art. Note values such as whole notes, half notes, quarter notes, eighth notes and sixteenth notes each have known duration values for a given time signature. In addition, rest values such as whole rests, half rest, quarter rests, eighth rests and sixteenth rests also have known duration values for a given time signature. Dots are placed next to a note to indicate that the note receives one and one-half its duration value.

In one embodiment of the present invention, the cadence blocks are shaped to resemble a note value or a rest value. Alternatively, a cadence block may have the note value or rest value printed or otherwise etched on it. In either of these manners, the duration value can be visually ascertained.

Tactile indication of the duration value involves a reference feature on each of the cadence blocks. As with the master blocks, a reference feature for a cadence block is a physical characteristic that is proportional in dimension to the duration value represented by the block for a given time signature. The reference feature may be thickness, length, height, width or any other physical characteristic of the cadence block which has a dimension.

In determining the correct rhythm for a measure, the reference feature(s) of one or more cadence blocks is/are compared to the reference feature of a master block having a given time signature. In the case where the reference features of the master and cadence blocks is the thickness, the correct rhythm is ascertained by laying the selected cadence blocks one on top of the other to see if their combined thickness equals that of the master block. If the combined thicknesses for the selected cadence block(s) is equal to that of the master block, then the student knows that the selected cadence blocks are of the correct rhythm.

As stated above, common note values include whole notes, half notes, quarter notes, eighth notes and sixteenth notes. The preceding list is not meant to be comprehensive, and other note values are within the scope of the present invention.

An illustrative whole note block 150 is shown in FIG. 5A. The whole note block 150 is configured in shape to resemble the appearance of a whole note as would be observed on a sheet of music. A top surface 152 and a bottom surface (shown in FIG. 5B) of the whole note block 150 are generally oval shaped. An orifice 154 extending from the top surface 152 to the bottom surface, most easily observed in FIG. 1B, is located in the center of the top surface 152.

The thickness of the whole note block 150 between the top surface 152 and the bottom surface 153, generally represented by the double arrow marked with the reference numeral 156 in FIG. 5B, is determined in proportion to the thickness of the four-four time signature block 110. Since a whole note comprises four quarter notes, in four-four time it can easily be determined that the thickness of the whole note block 150 should be the same as the four-four time signature block 110. In the case of the embodiment wherein the four-four time signature block 110 has a thickness of about 1.25 inches, the whole note block 150 would have a thickness of about 1.25 inches.

An illustrative quarter note block 160 is shown in FIG. 6A. The quarter note block 160 is configured in shape to resemble the appearance of a quarter note as would be observed on a sheet of music. A top surface 162 and a bottom surface (shown in FIG. 6B) of the quarter note block 160 comprise a solid oval shaped bottom with an attached tail.

The thickness of the quarter note block 160 between its top surface 162 and bottom surface 163, generally represented by the arrows marked with the reference numeral 164 in FIG. 6B, is determined in proportion to the thickness of the four-four time signature block 110. Since a quarter note receives one beat and because there are four beats in a measure in four-four time, the thickness of the quarter note block 160 should be ¼ that of the four-four time signature block 110. In the case of the embodiment of the invention wherein the four-four time signature block 110 has a thickness of about 1.25 inches, the quarter note block 160 would have a thickness of about 0.313 inches.

Figure 7B:
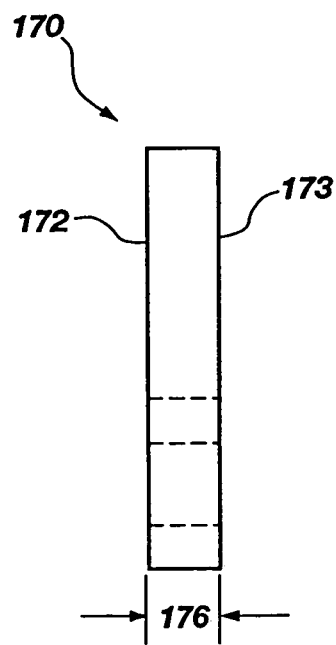
FIGS. 7A and 7B are schematic views of a half note block.
Figure 7A:
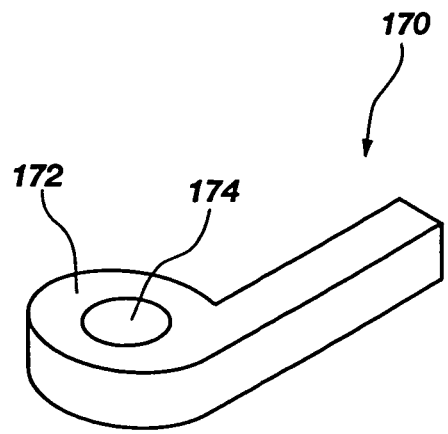

An illustrative half note block 170 is shown in FIG. 7A. The half note block 170 is configured in shape to resemble the appearance of a half note as would be observed on a sheet of music. A top surface 172 and a bottom surface 173 (shown in FIG. 7B) of the half note block 170 comprise an oval shaped bottom with an attached tail. In the center of the oval shaped bottom, an orifice 174 extends from the top surface to the bottom surface.

The thickness of the half note block 170 between the top surface 172 and the bottom surface 173, generally represented by the arrows marked with the reference numeral 176 in FIG. 7B, is determined in proportion to the thickness of the four-four time signature block 110. Since a half note receives two beats and because there are four beats in a measure in four-four time, the thickness of the half note block 170 should be ½ that of the four-four time signature block 110. In the case of the embodiment of the invention wherein the four-four time signature block 110 has a thickness of about 1.25 inches, the half note block 170 would have a thickness of about 0.625 inches.

Figure 8B:
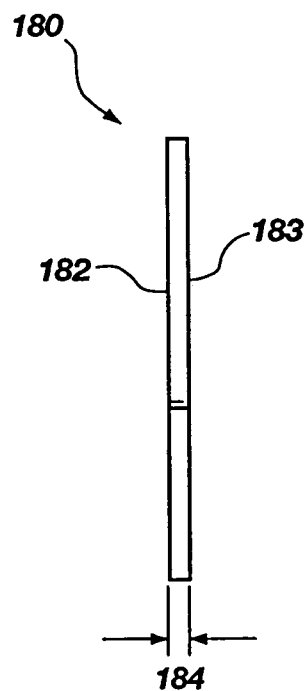
FIGS. 8A and 8B are schematic views of an eighth note block.
Figure 8A:
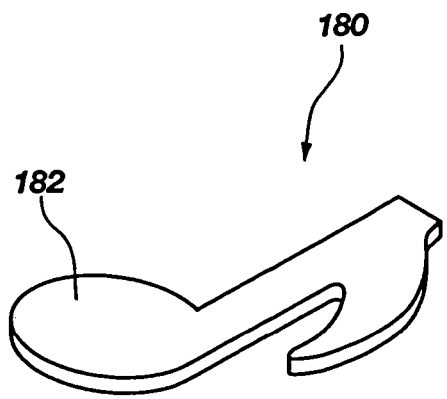

An illustrative eighth note block 180 is shown in FIG. 8A. The eighth note block 180 is configured in shape to resemble the appearance of an eighth note as would be observed on a sheet of music. In particular, a top surface 182 and a bottom surface 183 (shown in FIG. 8B) of the eighth note block 180 comprise an oval shaped bottom with an attached tail with an attached curlie.

The thickness of the eighth note block 180 between the top surface 182 and the bottom surface 183, generally represented by the arrows marked with the reference numeral 184 in FIG. 8B, is determined in proportion to the thickness of the four-four time signature block 110. Since an eighth note receives one-half of a beat and because there are four beats in a measure in four-four time, the thickness of the eighth note block 180 should be ⅛ that of the four-four time signature block 110. In the case of the embodiment wherein the four-four time signature block 110 has a thickness of about 1.25 inches, the eighth note block 180 would have a thickness of about 0.156 inches.

Like notes, rests also have a relative duration value for a given time signature. Rests include, without limitation, whole note rests, half note rests, quarter note rests, eighth note rests and sixteenth note rests. Other rest values as known to those skilled in the art are also within the scope of the present invention. Rests typically indicate the relative duration for which no music is played.

An illustrative whole note rest block 190 is shown in FIG. 9A. The whole note rest block 190 is configured in shape to resemble the appearance of a whole note rest as would be observed on a sheet of music. In particular, a top surface 192 and a bottom surface 193 (shown in FIG. 9B) of the whole note rest block 190 comprise a first rectangular portion along with a second rectangular, the second rectangular portion representing part of the staff line.

The thickness of the whole note rest block 190 between the top surface 192 and the bottom surface 193, generally represented by the double arrow marked with the reference numeral 194 in FIG. 9B, is determined in proportion to the thickness of the four-four time signature block 110. Since a whole note rest receives four beats and because there are four beats in a measure in four-four time, the thickness of the whole note rest block 190 should be equal to that of the four-four time signature block 110. In the case of the embodiment wherein the four-four time signature block 110 has a thickness of about 1.25 inches, the whole note rest block 190 would have a thickness of about 1.25 inches.

An illustrative quarter note rest block 200 is shown in FIG. 10A. The quarter note rest block 200 is configured in shape to resemble the appearance of a quarter note rest as would be observed on a sheet of music. A top surface 202 and a bottom surface 203 (shown in FIG. 10B) of the quarter note rest block 200 comprise two curved lines meeting at each end.

The thickness of the quarter note rest block 200 between its top surface 202 and its bottom surface 203, generally represented by the arrows marked with the reference numeral 204 in FIG. 10B, is determined in proportion to the thickness of the four-four time signature block 110. Since a quarter note rest receives one beat and because there are four beats in a measure in four-four time, the thickness of the quarter note rest block 200 should be ¼ that of the four-four time signature block 110. In the case of the embodiment wherein the four-four time signature block 110 has a thickness of about 1.25 inches, the quarter note rest block 200 would have a thickness of about 0.313 inches.

An illustrative half note rest block 210 is shown in FIG. 11A. The half note rest block 210 is configured in shape to resemble the appearance of a half note rest as would be observed on a sheet of music. A top surface 212 and a bottom surface 213 (shown in FIG. 11B) of the half note rest block 210 comprise two rectangular portions.

The thickness of the half note rest block 210 between the top surface 212 and the bottom surface 213, generally represented by the arrows marked with the reference numeral 214 in FIG. 11B, is determined in proportion to the thickness of the four-four time signature block 110. Since a half note rest receives two beats and because there are four beats in a measure in four-four time, the thickness of the half note rest block 210 should be ½ that of the four-four time signature block 110. In the case of the embodiment wherein the four-four time signature block 110 has a thickness of about 1.25 inches, the half note rest block 210 would have a thickness of about 0.625 inches.

Figure 12B:
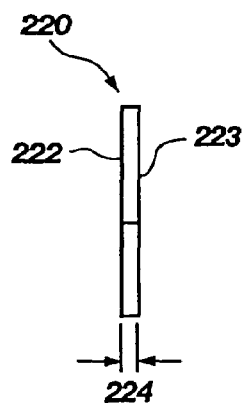
FIGS. 12A and 12B are schematic views of an eighth note rest block.
Figure 12A:
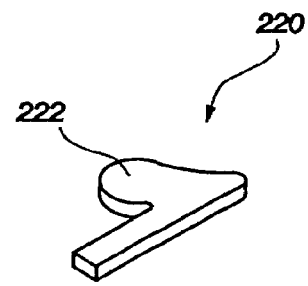

An illustrative eighth note rest block 220 is shown in FIG. 12A. The eighth note rest block 220 is configured in shape to resemble the appearance of an eighth note rest as would be observed on a sheet of music. In particular, a top surface 222 and a bottom surface 223 (shown in FIG. 12B) of the eighth note rest block 220 comprise a swooped portion with an attached tail.

The thickness of the eighth note rest block 220 between the top surface 222 and the bottom surface 223, generally represented by the arrows marked with the reference numeral 224 in FIG. 12B, is determined in proportion to the thickness of the four-four time signature block 110. Since an eighth note rest receives one-half of a beat and because there are four beats in a measure in four-four time, the thickness of the eighth note rest block 220 should be ⅛ that of the four-four time signature block 110. In the case of the embodiment wherein the four-four time signature block 110 has a thickness of about 1.25 inches, the eighth note rest block 220 would have a thickness of about 0.156 inches.

A dot is used to lengthen the relative duration of a note by one half of its normal duration. On a sheet of music, a dot is placed directly after the note. In a four-four time signature a dotted half note receives three beats, a dotted quarter note receives one and a half beats and a dotted eighth note receives three quarters of a beat.

Figure 13B:
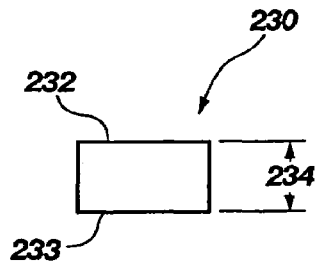
FIGS. 13A and 13B are a schematic view of a ¼ dot block.
Figure 13A:
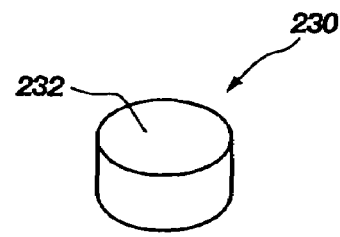

An illustrative quarter dot block 230 is shown in FIG. 13A. The quarter dot block 230 is configured in shape to resemble the appearance of a dot as would be observed on a sheet of music. A top surface 232 and a bottom surface 233 (shown in FIG. 13B) of the quarter dot block 230 comprise a round circle.

The thickness of the quarter dot block 230, generally represented by the double arrow marked with the reference numeral 234 in FIG. 13B, should be the same thickness as that of a quarter note block 160 for a given time signature. In the case of the embodiment wherein the four-four time signature block 110 has a thickness of about 1.25 inches, the quarter dot block 230 would have a thickness of about 0.313 inches, the same thickness that a quarter note block 160 would have.

Figure 14B:
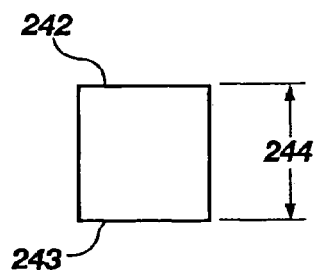
FIGS. 14A and 14B are a schematic view of a ½ dot block.
Figure 14A:
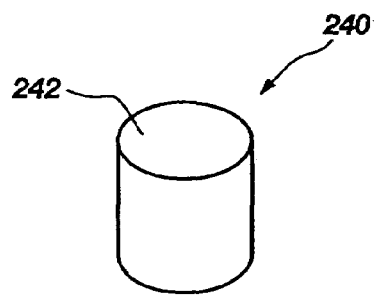

An illustrative half dot block 240 is shown in FIG. 14A. The half dot block 240 is configured in shape to resemble the appearance of a dot as would be observed on a sheet of music. A top surface 242 and a bottom surface 243 (shown in FIG. 14B) of the half dot block 240 comprise a round circle.

The thickness of the half dot block 240, generally represented by the double arrow marked with the reference numeral 244 in FIG. 14B, should be the same thickness as that of a half note block 170 for a given time signature. In the case of the embodiment wherein the four-four time signature block 110 has a thickness of about 1.25 inches, the half dot block 240 would have a thickness of about 0.625 inches, the same thickness that a half note block 170 would have.

Figure 15B:
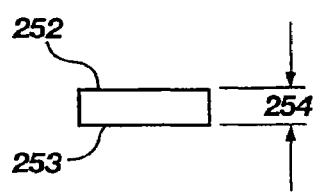
FIGS. 15A and 15B are schematic views of a ⅛ dot block.
Figure 15A:
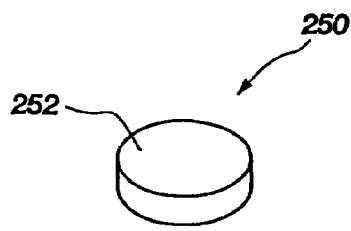

An illustrative eighth dot block 250 is shown in FIG. 15A. The eighth dot block 250 is configured in shape to resemble the appearance of a dot as would be observed on a sheet of music. A top surface 252 and a bottom surface 253 (shown in FIG. 15B) of the eighth dot block 250 comprise a round circle.

The thickness of the eighth dot block 250 between the top surface 252 and the bottom surface 253, generally represented by the arrows marked with the reference numeral 254 in FIG. 15B, should be the same thickness as that of an eighth note block 180 for a given time signature. In the case of the embodiment wherein the four-four time signature block 110 has a thickness of about 1.25 inches, the eighth dot block 250 would have a thickness of about 0.156 inches, the same thickness that an eighth note block 180 would have.

Notation Blocks

As the term is used herein, "notation block" refers to any block representing visually any musical symbol used in writing music other than time signatures, notes and rests. These musical symbols may include, without limitation, slurs and bar lines. Other musical symbols that are also within the scope of the present invention include, without limitation ties, bar lines, repeat dots, accidentals, staccato mark, tenuto mark, accent mark, and hair pins.

A slur is a curved line placed over or under notes of different pitch. It indicates that the notes contained within the slur are to be played smoothly (Legato). For example, wind instrument players play these notes in one continuous breath with only the first note tongued.

An illustrative slur block 260 is shown in FIG. 16A. The slur block 260 is configured in shape to resemble the appearance of a slur as would be observed on a sheet of music. A top surface 262 and a bottom surface 263 (shown in FIG. 16B) of the slur block 260 are each formed by a curved line of arbitrary thickness.

The thickness of the slur block 260 between the top surface 262 and the bottom surface 263, generally represented by the arrows marked with the reference numeral 264 in FIG. 16B, is arbitrary since a the thickness of a slur block 260 is not compared to any other blocks. In one embodiment of the invention the thickness of the slur block 260 is 0.125 inches.

A bar line is used to indicate the end of a measure. An illustrative bar line block 270 is shown in FIG. 17A. The bar line block 270 is configured in shape to resemble the appearance of a bar line as it would be observed on a sheet of music. A top surface 272 and a bottom surface 273 (shown in FIG. 17B) of the bar line block 270 are each formed by a straight line of arbitrary thickness.

The thickness of the bar line block 270 between the top surface 272 and the bottom surface 273, generally represented by the arrows marked with the reference numeral 274 in FIG. 17B, is arbitrary since the thickness of a bar line block 270 is not compared to any other blocks. In one embodiment of the invention the thickness of the bar line block 270 is about 0.38 inches.

Figure 18A:
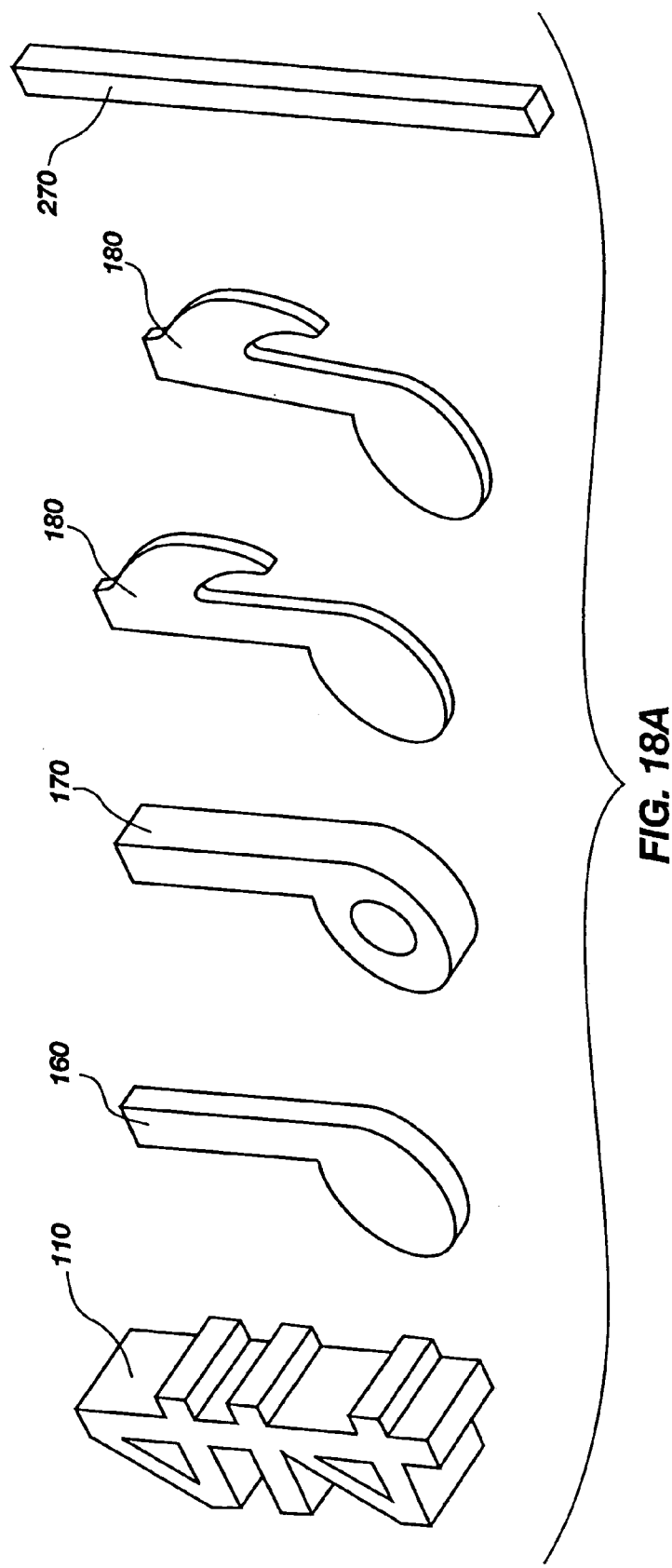

FIGS. 18A, 18B, 18C and 19 illustrate examples of how the present invention may be used to both visually and tactilely find the correct rhythm for a given time signature. This example should not be construed as limiting the scope of the present invention, but only one of the possible arrangements for carrying out the present invention. In FIG. 18A, a master block, four cadence blocks, and a notation block are arranged to represent one measure. The master block in this case is a four-four time signature block 110. The four cadence blocks are a quarter note block 160, a half note block 170, two eighth note blocks 180. The notation block is a bar line block 270. As mentioned, the various blocks in FIG. 18A have been arranged to represent one measure. When read from left to right, the master block is first, followed by the cadence blocks and then the notation block.

The blocks can be visually read to determine the correct rhythm as is well known in the art. This is simply reading the blocks as if it were a sheet of music. In particular, the four-four time signature block 110 indicates that there are four beats per measure and that a quarter note receives one beat. From this information, it can be determined that the quarter note block 160 represents one beat, the half note block 170 receives two beats, and the two eighth note blocks 180 each receive one-half of a beat, for a total of four beats, which is the correct rhythm for a measure having four-four time. The bar line block 270 serves to indicate the end of the measure.

Figure 18B:
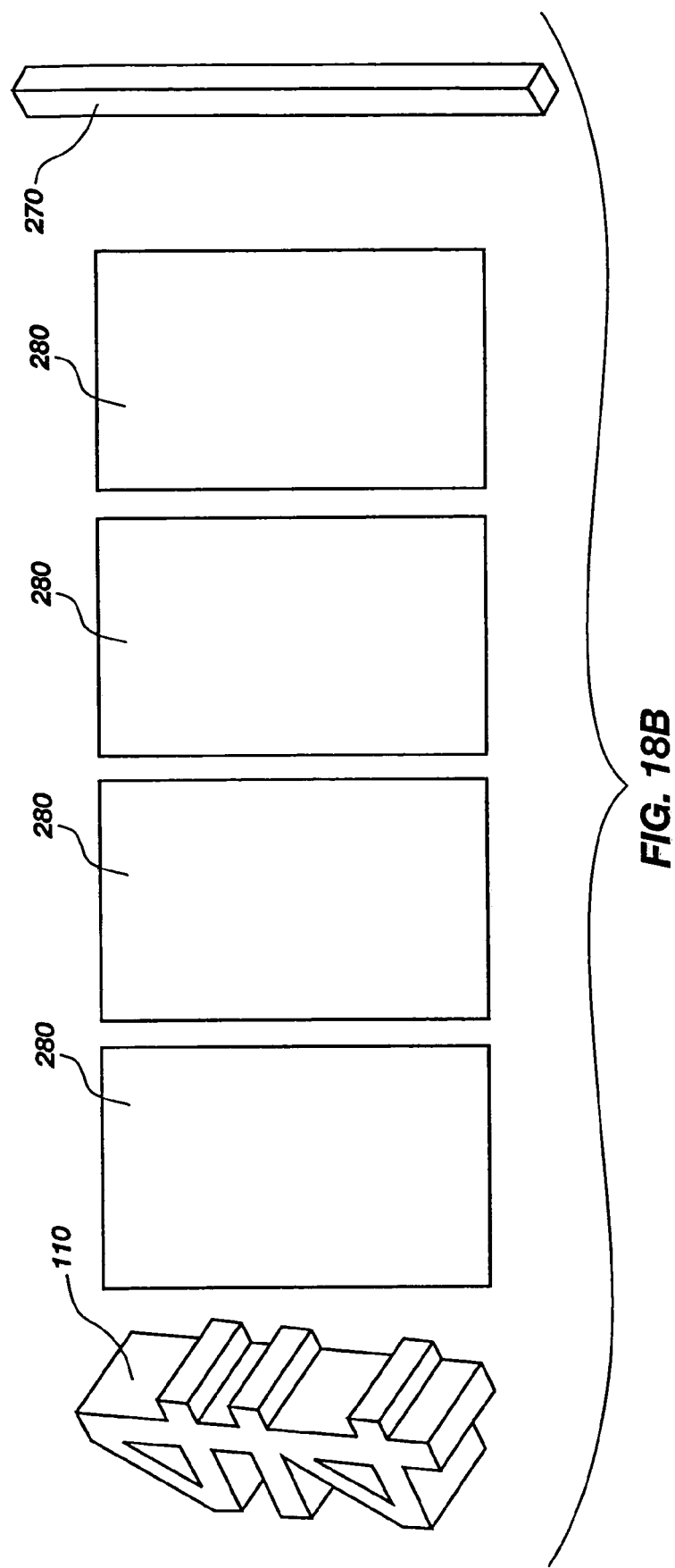

FIG. 18B illustrates the use of beat mats 280. Each beat mat 280 is used to represent one beat in a measure. In four-four time, four beat mats 280 are used to illustrate each beat as shown in FIG. 18B. A beat mat 280 can be of any size, but in one embodiment the beat mat is two inches by three inches. Typically, the beat mats 280 are made from material, but may be made from any material, including without limitation plastic, paper, or foam. Before laying down the cadence blocks, the beat mats 280 can be laid down to form a measure along with a time signature block and a bar line block 270. The use of the beat mats helps the student when choosing and placing the cadence blocks.

FIG. 18C illustrates the same time signature and cadence blocks as used in FIG. 18A, with the inclusion of several beat mats 280 as shown in FIG. 18B. Cadence blocks equaling one beat are placed on each mat. For cadence blocks receiving more than one beat, the block may be laid on the first mat and leaving the second mat open or the block may be laid across both mats.

FIG. 19 illustrates the tactile use of the blocks to determine the correct rhythm by using the reference features of the master and cadence blocks. In this case, the reference feature of the blocks is the thickness of the blocks. FIG. 19 illustrates the same blocks as represented in FIG. 18. The quarter note block 160, half note block 170, and the two eighth note blocks 180 have all been laid one over the other. The combined thickness of these blocks is equal to that of the four-four time signature block 110. Because the thicknesses are equal, this indicates that the rhythm of the measure is correct. If the rhythm was incorrect, then the heights would not be equal. The bar line block 270 (see FIG. 18) is not used because it is a notation block which has no direct impact on the rhythm.

It will be appreciated from the above provided example that the present invention can be used to both visually and tactilely teach rhythm. This allows students who do not know how to read music to easily determine the correct rhythm for a measure for a given time signature by a comparison.

It should also be noted that systems illustrative of the present invention can comprise any number of blocks as long as there is at least one master block and sufficient cadence blocks to find the correct rhythm for a measure of music. A system therefore could comprise as few as two blocks. There is no upper limit, however, on the number of blocks that can be included in a system. A system within the scope of the present invention could include enough blocks to find the rhythm of a entire musical composition, for example.

Also, the measurements and dimensions of the blocks noted herein may not be required to the exact numerical precision as stated but it is the impression provided to a student that is important. For example, it is not necessary that a block be exactly three-quarters the height of another block. Slight variances due to manufacturing tolerances are acceptable. It is only necessary that a student perceive tactilely that the block is three-quarters the height.

Figure 20:
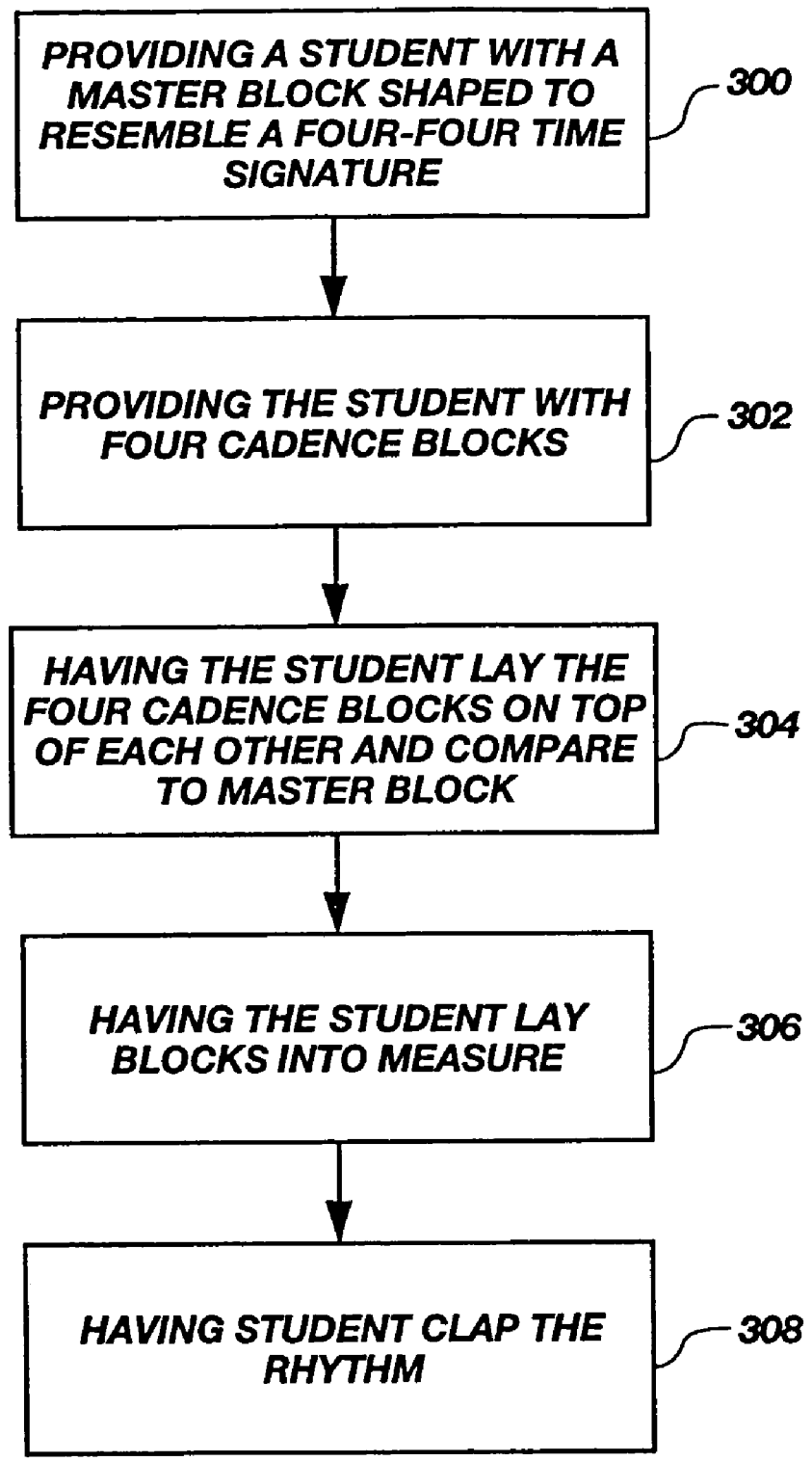
FIG. 20 is an examplary flow diagram of a method for teaching musical rhythm.

Reference will now be made to the exemplary flow diagram of FIG. 20. In one illustrative embodiment of the present invention there is represented a method to teach musical rhythm. The first step is to provide a student with at least one master block shaped to resemble four-four time signature (step 300). The next step is to provide the student with four cadence blocks shaped to resemble quarter notes (step 302). The student is then instructed to lay the four cadence blocks one on top of the other and compare their thickness to that of the master block (step 304). Once the student understands this principle, the student is then instructed to lay all of the blocks out in a measure (step 306). The student then performs the correct rhythm, for example by clapping (step 308).

Figure 21:
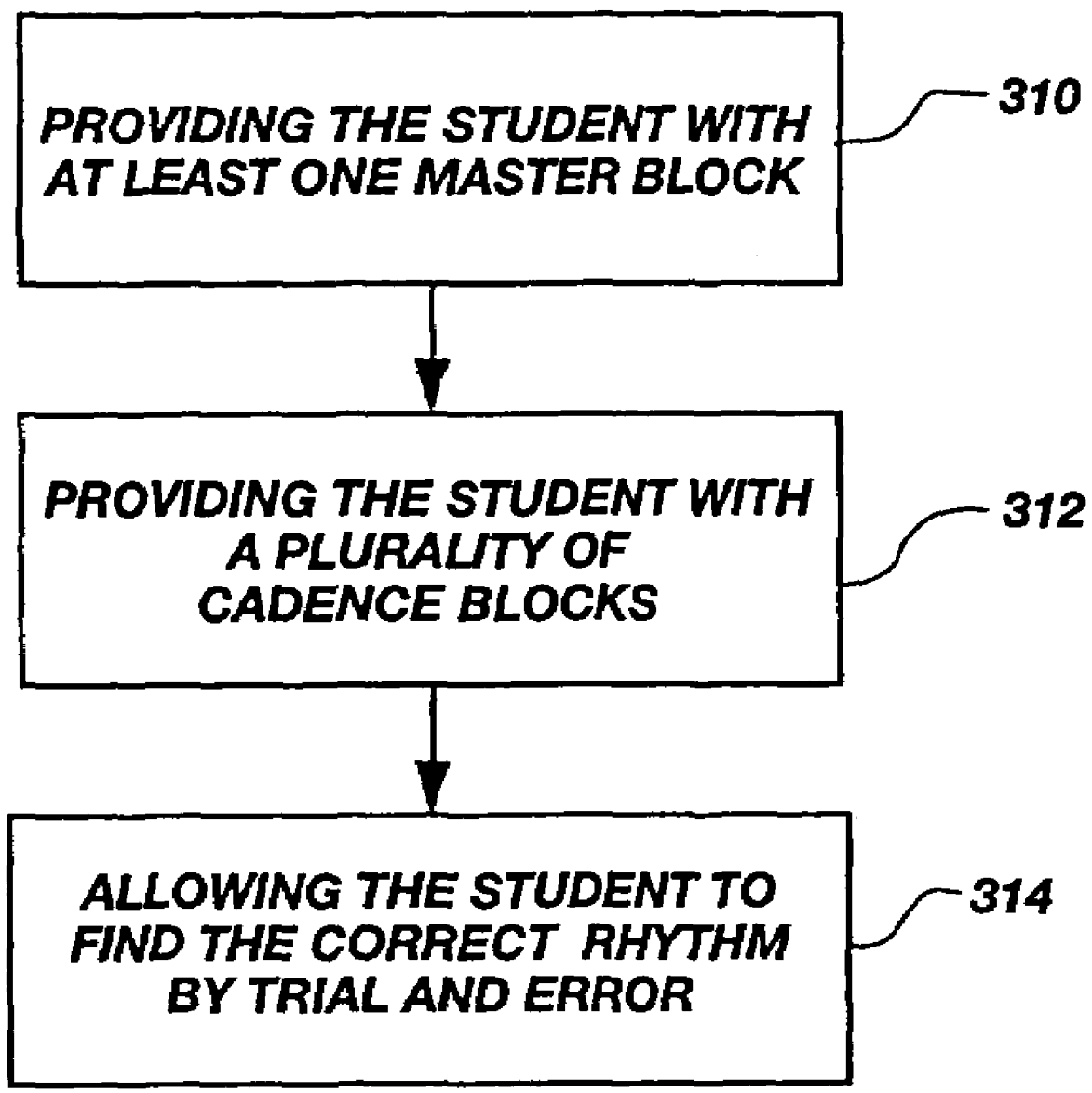
FIG. 21 is an examplary flow diagram showing another method for teaching musical rhythm.

Reference will now be made to the exemplary flow diagram of FIG. 21. In this illustrative embodiment of the present invention there is represented a method to teach musical rhythm. The first step is to provide a student with at least one master block (step 310). The next step is to provide the student with a plurality of cadence blocks (step 312). The student is allowed by trial and error to find the correct rhythm for a measure of music using both visual and tactile methods (step 314).

Those having ordinary skill in the relevant art will appreciate the advantages provided by the features of the present invention. For example, the use of blocks to both visually and tactilely teach rhythm is an improvement over the prior art. Another feature of the present invention is to construct the blocks from thermoplastic, thereby assuring that each block is of the correct thickness as well as limit the damage to the blocks during use. It is a further feature of the present invention, in accordance with one aspect thereof, to provide blocks shaped as dots, slurs and bar lines, none of which is found in prior art.

In the foregoing Detailed Description, various features of the present invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single disclosed embodiment. Thus, the following claims are hereby incorporated into this Detailed Description by this reference, with each claim standing on its own as a separate embodiment of the present invention.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements. Thus, while the present invention has been shown in the drawings and described above with particularity and detail, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. A system for teaching musical rhythm, said system comprising:
   at least one master block, each of the at least one master block visually conveying to an observer a time signature, one of the at least one master block comprising a control reference feature having a benchmark dimension, and each of the remaining at least one master block, if any, comprising a control reference feature having a dimension relative to said benchmark dimension and its visually conveyed time signature; and
   a plurality of cadence blocks, each of the plurality of cadence blocks visually conveying to an observer a duration value, and each of the plurality of cadence blocks comprising a reference feature relative in dimension to its duration value and the benchmark dimension;
   wherein the musical rhythm in a given musical measure can be correctly determined by either (1) visually reading one of the at least one master block and one or more of the cadence blocks; or (2) tactilely comparing the dimension of the control reference feature of one of the at least one master block to the dimension of the reference feature of one or more of the plurality of cadence blocks to see if they are equal.

2. The system of claim 1 wherein the at least one master block and the plurality of cadence blocks are comprised of thermoplastic.

3. The system of claim 2 wherein each of the at least one master block comprises a first side having a thickness, wherein said control reference feature is the thickness of the first side.

4. The system of claim 3 wherein each of the plurality of cadence blocks comprises a second side having a thickness, wherein said reference feature is the thickness of second side.

5. The system of claim 4 wherein each of the plurality of cadence blocks is shaped to resemble a note, a rest or a dot.

6. The system of claim 5 wherein each of the at least one master block is shaped to resemble a time signature having an upper number and a lower number.

7. The system of claim 4 wherein each of the plurality of cadence blocks has a note, rest or dot indicated thereon.

8. The system of claim 7 wherein each of the at least one master blocks has a time signature displayed thereon.

9. The system of claim 2 further comprising a plurality of notation blocks, each of said plurality of notation blocks visually indicating music notational symbols commonly used in composing music.

10. The system of claim 9 wherein the plurality of notation blocks comprises a block visually indicating a slur and a block visually indicating a bar line.

11. The system of claim 9 wherein the plurality of notation blocks comprise at least one block shaped as a slur and at least one block shaped as a bar line.

12. The system of claim 5 wherein the plurality of cadence blocks comprise at least one block shaped as a whole note, at least one block shaped as a half note, at least one block shaped as a quarter note, and at least one block shaped as an eighth note.

13. The system of claim 5 wherein the plurality of cadence blocks comprise at least one block shaped as a whole rest, at least one block shaped as a half rest, at least one block shaped as a quarter rest, and at least one block shaped as an eighth rest.

14. The system of claim 5 wherein the plurality of cadence blocks comprise at least one block shaped as a dot.

15. The system of claim 14 wherein the plurality of cadence blocks comprise at least one block shaped as a half dot and at least one block shaped as a quarter dot.

16. The system of claim 6 wherein one of the at least one master block is shaped to resemble a four-four time signature.

17. The system of claim 16 wherein one of the at least one master block is shaped to resemble a three-four time signature.

18. The system of claim 17 wherein one of the at least one master block is shaped to resemble a two-four time signature.

19. The system of claim 18 wherein one of the at least one master block is shaped to resemble a six-eight time signature.

20. A system for teaching musical rhythm, said system comprising:
  a master block shaped to resemble a time signature, said master block comprising a first side having a thickness, said thickness being a benchmark dimension; and
  a plurality of cadence blocks, each of said cadence blocks shaped to resemble a note or a rest, said note or rest each having a duration value relative to said time signature, each of said cadence blocks having a thickness relative to its duration value and the benchmark dimension;
  wherein the correct rhythm for the measure of music can be determined by either (1) visually reading the master block and one or more of the cadence blocks; or (2) comparing the combined thickness of one or more of the cadence blocks to the thickness of the master block to ascertain if they are equal.

21. The system of claim 20 wherein the master block and the plurality of cadence blocks are comprised of thermoplastic.

22. The system of claim 21 wherein the time signature is chosen from the group consisting of four-four time, three-four time, two-four time and six-eight time.

23. The system of claim 22 wherein the plurality of cadence blocks comprise at least one block shaped as a whole note, at least two blocks shaped as half notes, and at least four blocks shaped as quarter notes.

24. The system of claim 23 wherein the plurality of cadence blocks further comprise at least eight blocks shaped as eighth notes.

25. The system of claim 22 wherein the plurality of cadence blocks comprise at least one block shaped as a whole rest, at least two blocks shaped as half rests, and at least four blocks shaped as quarter rests.

26. The system of claim 25 wherein the plurality of cadence blocks further comprise at least one block shaped as an eighth rest.

27. The system of claim 21 wherein the thickness of the master block is about 1.25 inches and the time signature is four-four time.

28. The system of claim 27 wherein the plurality of cadence blocks comprise at least one block shaped as a whole note, at least one block shaped as a half note, at least one block shaped as a quarter note and at least one block shaped as an eighth note, and wherein the thickness of a block shaped as a whole note is about 1.25 inches, the thickness of a block shaped as a half note is about 0.625 inches, the thickness of a block shaped as quarter note is about 0.313 inches, and the thickness of a block shaped as an eighth note is about 0.156 inches.

29. The system of claim 28 wherein the plurality of cadence blocks further comprise at least one block shaped as a whole rest, at least one block shaped as a half rest, at least one block shaped as a quarter rest, and at least one block shaped as an eighth rest, wherein the thickness of a block shaped as a whole rest is about 1.25 inches, the thickness of a block shaped as a half rest is about 0.625 inches, the thickness of a block shaped as quarter rest is about 0.313 inches, and the thickness of a block shaped as an eighth rest is about 0.156 inches.

30. The system of claim 21 further comprising a plurality of master blocks, each of the master blocks representing a distinct time signature.

31. The system of claim 21 wherein the plurality of cadence blocks further comprise at least one block shaped as a dot.

32. The system of claim 21 further comprising a plurality of notation blocks, said plurality of notation blocks being comprised of blocks shaped as musical notation.

33. The system of claim 32 wherein the plurality of notation blocks comprise at least one block shaped as a slur.

34. The system of claim 33 wherein the plurality of notation blocks comprise at least one block shaped as a bar line.

35. A system for teaching musical rhythm, said system comprising:
  a block shaped to resemble a time signature;
  a first plurality of blocks, each of said first plurality of blocks shaped to resemble a note or a rest;
  a second plurality of blocks, each of the second plurality of blocks shaped to resemble a slur or a bar line;
  wherein said block, first plurality of blocks and the second plurality of blocks are comprised of thermoplastic; and
  wherein the shapes of said block and of said first plurality of blocks each has a dimension related to time.

36. The system of claim 35 wherein the block comprises a first side having a thickness and each of the plurality of blocks comprises a second side also having a thickness, wherein the thickness of the block is of such a dimension to thereby only allow one or more of the first plurality of blocks comprising a correct rhythm for a measure of music to be of equal thickness.

37. The system of claim 36 wherein the first plurality of blocks further comprises at least one block shaped to resemble a dot.

38. The system of claim 36 wherein the second plurality of blocks comprises at least one block shaped as a bar line.

39. The system of claim 38 wherein the second plurality of blocks further comprises at least one block shaped as a slur.

40. The system of claim 36 wherein the block is shaped to resemble a four-four time signature.

41. The system of claim 40 wherein the first plurality of blocks comprises at least one block shaped as a whole note, at least two blocks shaped as a half note, and at least four blocks shaped as a quarter note.

42. The system of claim 41 wherein the first plurality of blocks comprises at least one block shaped as a whole rest, at least one block shaped as a half rest, and at least one block shaped as a quarter rest.

43. A system for teaching musical rhythm for a measure of music, said system comprising:
   at least one master block, each of the at least one master block comprising a first indicator means for visually conveying to an observer a time signature, and each of the at least one master block further comprising a first reference means for tactilely determining the correct rhythm for the measure of music; and
   a plurality of cadence blocks, each of the plurality of cadence blocks comprising a second indicator means for visually conveying to an observer a duration value, and each of the plurality of cadence blocks further comprising a second reference means for tactilely determining the correct rhythm for the measure of music;
   wherein the musical rhythm for the measure of music can be correctly determined by either (1) sight reading the first indicator means of one of the at least one master block and the second indicator means of one or more of the cadence blocks, or (2) comparing the first reference means of one of the at least one master block to the second reference means of one or more cadence blocks.

44. The system of claim 43 wherein the at least one master block and the plurality of cadence blocks are comprised of thermoplastic.

45. The system of claim 44 further comprising a plurality of notation blocks, each of the plurality of notation blocks comprising a third indicator means for visually conveying a musical symbol used in composing music.

46. The system of claim 43 wherein the first and second indicator means is text.

47. The system of claim 43 wherein the first indicator means is a display of a time signature, and the second indicator means comprises a display of a note, rest or a dot.

48. The system of claim 43 wherein the first indicator means is the shape of each of the at least one master block, and the second indicator means is the shape of each of the plurality of cadence blocks.

49. The system of claim 43 wherein the first reference means is the thickness of each of the at least one master block, and the second reference means is the thickness of each of the plurality of cadence blocks.

50. The system of claim 49, wherein the correct rhythm is determined be comparing the thickness of one of the at least one master block to the thickness of one or more of the plurality of cadence blocks.

51. The system of claim 43 wherein the time signature is chosen from the group consisting of four-four time, three-four time, and two-four time.

52. A method for teaching the correct musical rhythm for a measure of music to a student, said method comprising the steps of:
   providing the student with a master block shaped to resemble a four-four time signature, said master block having a reference thickness relative to said four-four time signature;
   providing the student with four cadence blocks, each of the four cadence blocks being shaped to resemble a quarter note, each of the four cadence blocks having a thickness of one-quarter of the reference thickness of the master block;
   having the student lay the cadence blocks one on top of the other and place them along side the master block thereby allowing the student to observe that the combined thickness of the four cadence blocks equals that of the reference thickness of the master block;
   having the student lay out the master block and the four cadence blocks in the measure; and
   having the student perform the correct rhythm.

53. The method of claim 52 further comprising the steps of:
   providing the student with a cadence block shaped as a quarter rest having a thickness one-quarter of the reference thickness of the master block;
   having the student substitute one of the cadence blocks shaped as a quarter note with the cadence block shaped as a quarter rest; and
   having the student lay the cadence blocks one on top of the other and place them along side the master block thereby allowing the student to observe that the combined thickness of the four cadence blocks equals that of the reference thickness of the master block;
   having the student lay out the master block and the four cadence blocks in a measure; and
   having the student perform the correct rhythm.

54. The method of claim 52 further comprising the steps of:
   providing the student with a cadence block shaped as a half note having a thickness one-half of the reference thickness of the master block;
   having the student substitute two of the cadence blocks shaped as quarter notes with the cadence block shaped as a half note;
   having the student to lay the cadence blocks one on top of the other and place them along side the master block thereby allowing the student to observe that the combined thickness of the cadence blocks equals that of the reference thickness of the master block;
   having the student lay out the master block and the four cadence blocks in the measure; and
   having the student clap the correct rhythm.

55. The method of claim 52 further comprising the steps of:
   providing the student with two cadence blocks shaped as a eighth notes, each having a thickness one-eighth of the reference thickness of the master block;
   having the student substitute one of the cadence blocks shaped as a quarter note with the two cadence block shaped as eighth notes;
   having the student lay the cadence blocks one on top of the other and place them along side the master block thereby allowing the student to observe that the combined thickness of the cadence blocks equals that of the reference thickness of the master block;
   having the student lay out the master block and the cadence blocks in the measure; and
   having the student clap the correct rhythm.

56. The method of claim 52 further comprising the steps of:
   providing the student with two additional cadence blocks shaped to resemble half notes;
   having the student arrange two measures of music using the two cadence blocks shaped as half notes and the four cadence blocks shaped as quarter notes;
   having the student clap the correct rhythm for the two measures; and having the student rearrange the cadence blocks in as many combinations as possible and having the student clap the correct rhythm for each of the combinations.

57. The method of claim 56 further comprising the steps of:
providing the student with a cadence block shaped to resemble a quarter rest;
having the student substitute one of the cadence blocks shaped as a quarter note with the cadence block shaped as a quarter rest;
having the student clap the two measures; and
having the student rearrange the cadence blocks in as many combinations as possible and having the student clap each of the combinations.

58. The method of claim 52 further comprising the steps of:
providing the student with additional master blocks shaped to resemble time signatures distinct from four-four time, each of the additional master blocks having a reference thickness relative to its time signature;
allowing the student to select a master block shaped as any time signature; and
allowing the student to determine either visually or tactilely the correct rhythm for a measure of music using the cadence blocks for the time signature of the selected master block.

59. The method of claim 58 wherein the step of providing the student with additional master blocks comprises the step of providing the student with master blocks shaped to resemble a three-four time signature and a two-four time signatures, the master block shaped to resemble a three-four time signature having a thickness three-quarters of the reference thickness, and the master block shaped to resemble a two-four time signature having a thickness one-half the reference thickness.

60. The method of claim 52 further comprising the step of:
providing the student with a cadence block shaped to resemble an eighth dot and two cadence blocks shaped to resemble eighth notes;
having the student lay out a measure of music using the two cadence blocks shaped to resemble eighth notes;
having the student then replace one of the blocks shaped to resemble and eighth notes with a dot; and
having the student clap the correct rhythm.

61. The method of claim 52 further comprising the step of:
providing the student with at least one block shaped to resemble a slur;
having the student lay out a measure of music using the at least one block shaped to resemble a slur to connect to two of the other cadence blocks;
having the student clap the correct rhythm.

62. A method for teaching correct musical rhythm to a student, said method comprising the steps of:
providing the student with at least one master block, one of the at least one master block comprising a control reference feature having a benchmark dimension, and each of the remaining at least one master block, if any, comprising a control reference feature having a dimension relative to said benchmark dimension and its visually conveyed time signature;
providing the student with a plurality of cadence blocks, each of the plurality of cadence blocks visually conveying to an observer a duration value, and each of the plurality of cadence blocks comprising a reference feature relative in dimension to its duration value and the benchmark dimension;
allowing the student to determine by trial and error the correct musical rhythm of one or more measures by (1) visually reading one of the at least one master block and one or more of the cadence blocks; or (2) tactilely comparing the dimension of the control reference feature of one of the at least one master block to the dimension of the reference feature of one or more of the plurality of cadence blocks to see if they are equal.

63. The method of claim 62 wherein the plurality of cadence blocks further comprises blocks shaped to resemble a note or a rest, each of the cadence blocks shaped to resemble a note or a rest having a thickness relative to a duration value determined by said note or rest and said benchmark dimension.

64. The method of claim 63 wherein the plurality of cadence blocks further comprises blocks shaped to resemble dots, each of the cadence blocks shaped to resemble a dot having a thickness relative to a duration value of a half note or quarter note and said benchmark dimension.

65. The method of claim 64 further comprising the step of providing the student with at least one block shaped to resemble a slur and at least one block shaped to resemble a bar line.

66. The method of claim 62 wherein the step of providing the student with a plurality of cadence blocks comprises the step of providing the student with at least one block shaped to resemble a whole note, at least two blocks shaped to resemble half notes and at least four blocks shaped to resemble quarter notes.

67. The method of claim 62 wherein the at least one master block and the plurality of cadence blocks are comprised of thermoplastic.

68. The method of claim 62 wherein the step providing the student with at least one master block comprises the step of providing the student with a master block shaped to resemble a four-four time signature.

69. A system for teaching musical rhythm, said system comprising:
a master block, said master block visually conveying a numerical value, said numerical value identifying a number of beats per measure;
a plurality of blocks, each of the plurality of blocks visually conveying a musical note; and
a plurality of objects;
wherein the plurality of objects may be laid out to indicate a correct number of beats in a measure for the numerical value indicated on the master block.

70. The system of claim 69 wherein the number of beats per measure is four.

71. The system of claim 69 wherein the master block and each of the plurality of blocks each have a first side having a thickness, wherein the thickness of the first side of the master block is such that only the first sides of a group of the plurality of blocks having the correct number of beats per measure, as determined by the musical notes indicated on each of the group of the plurality of blocks, will be of equal combined thickness as the first side of the master block.

72. The system of claim 69 further comprising a block visually conveying a bar line.

73. The system of claim 72 further comprising a block visually conveying a slur.

74. The system of claim 69 further comprising at least one block visually conveying a rest.

75. The system of claim 69 further comprising at least one block visually conveying a dot.

* * * * *